Jan. 10, 1933.  V. G. APPLE  1,893,833
VEHICLE BRAKE MECHANISM
Filed Aug. 8, 1928
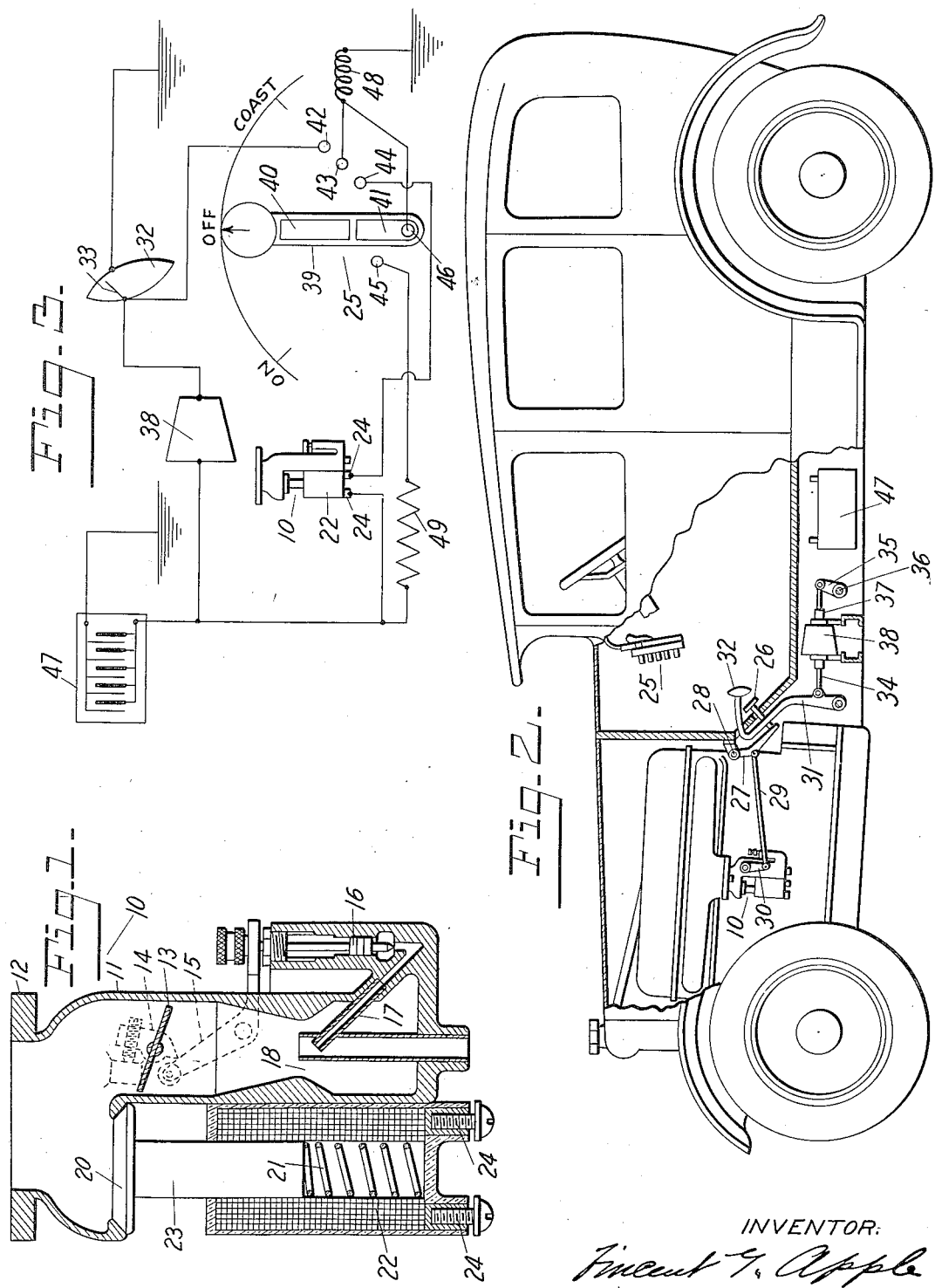
INVENTOR:
Vincent G. Apple
Burton and McConkey.
ATTORNEYS Patented Jan. 10, 1933

1,893,833

UNITED STATES PATENT OFFICE

VINCENT G. APPLE, OF DAYTON, OHIO, ASSIGNOR TO BENDIX BRAKE COMPANY, OF SOUTH BEND, INDIANA, A CORPORATION OF ILLINOIS

VEHICLE BRAKE MECHANISM

Application filed August 8, 1928. Serial No. 298,148.

My invention relates to improvements in vehicle brake mechanism, and particularly brake mechanism for a motor driven vehicle having electrically operated brake appliances.

One object is to provide in brake mechanism of this type means for utilizing the brake resistance of the engine when driven by the vehicle in the most efficient and economical fashion and without waste of fuel or harmful results.

Another object consists in the employment of electrically operated control means capable of applying the brakes, either with or without the assistance of the engine to produce braking torque, and to accomplish such result through the use of a single control device, and preferably through the employment of appliances now commonly used on motor vehicles.

A meritorius advantage consists in using an ignition switch having a plurality of positions, at one of which the brakes may be applied electrically independently of the engine, and at another of which the application of the brakes automatically brings the engine into play to function in the most efficient manner to exert braking torque.

More particularly I provide control means whereby the application of the brakes in the usual manner shuts off the ignition and the fuel supplied to the engine and permits free air to feed therethrough during the application of the brakes, and release of the brakes turns on the ignition and renders the fuel supply effective, and produces such results automatically upon application and release of the brakes.

Other desirable objects and advantageous features of my invention will more fully appear from the following specification, appended claims and accompanying drawing wherein,—

Fig. 1 is a cross section through an automotive engine carburetor having a feature of my invention embodied.

Fig. 2 is a part elevation and part section of a motor vehicle with my invention installed.

Fig. 3 is a diagram showing the wiring connections.

It is well known that the friction elements of the braking mechanism of a motor vehicle become considerably overheated when they are kept intensively and continuously applied for long periods, as they necessarily are in descending prolonged grades. This excessive heat not only produces rapid wear of the drums and deteriorates the brake linings, but is often transmitted through the wheel disc to the tires, to their injury.

Because of this inherent difficulty, drivers of hydrocarbon propelled vehicles have formed a practice of shutting off the ignition and then permitting the clutch to remain in engagement when descending severe grades so that the movement of the vehicle propels the engine, the retarding force thus created thus lightening the load on the friction elements.

The foregoing practice is however being discouraged by makers and distributors of motor vehicles because, since there is ordinarily no provision for shutting off the fuel when coasting with the ignition off and the clutch engaged and it sometimes happens that the muffler or manifold is destroyed by heavy charges of fuel which are left in the exhaust manifold and muffler becoming ignited when the ignition switch is afterward thrown on for normal running.

Added to the above objection to this method of retarding a vehicle is the further objection of the cost of the fuel which is being pumped through the engine unignited as long as this method of coasting is continued. In mountainous country the fuel waste will be considerable.

To overcome the foregoing objections to the practice of relieving the friction elements of the brakes by driving the engine, I provide a simple mechanism which permits this practice safely and without wasting fuel or ignition current and which at the same time keeps the engine cooler.

In the drawing, Fig. 1 is a cross section through a specially constructed carburetor 10. The major portion of this carburetor is however, made according to the standard practice and includes the body 11, manifold flange 12, throttle 13, stop 14, fuel lever 15, needle valve 16, jet 17, venturi 18, etc. The float chamber and other essential parts of the conventional carburetor, though required in practice, have no connection with the present invention and are consequently not shown.

The portion of the carburetor which is novel comprises an air by-pass valve 20 kept normally closed by a spring 21 but adapted to be opened by solenoid coil 22. The valve stem 23 is of considerable diameter and of magnetizable material to provide a suitable core. The ends of the coil are joined to terminal posts 24 and the coil is secured against movement by any suitable means of attachment to body 11.

It will be apparent that when current is supplied to binding posts 24, valve 20 will be opened; that when the current is withdrawn the valve will close; that with valve 20 wide open and throttle 13 closed to idling position there will be no vacuum in venturi 18 and no fuel will be drawn; and that the wide opening provided by valve 20 will permit the passage of a large volume of air through the engine to dissipate the heat being generated.

While my improved carburetor might be connected to a source of current by a suitable switch to constitute a workable auxiliary braking means, the combination thereof with a specially constructed ignition switch and electrically operable friction braking means provides a system having many advantages.

In Fig. 2 I show a side elevation of an automobile with a portion broken away to show the relative position of the several elements of my system.

The accelerator pedal 26, lever 27, fulcrum 28, rod 29, and throttle arm 30 are all according to standard practice, but the carburetor 10 is that shown to a larger scale in Fig. 1.

The brake pedal 31 is special in that the tread 32 contains a switch 33 (see Fig. 3), normally open, but which closes when the pedal is depressed after a particular fashion. This brake pedal is described and claimed in my co-pending application, Ser. No. 295,581.

The rod 34 which connects pedal 31 to brake arm 35 on brake shaft 36 is special, in that it carries a core 37 for solenoid 38 which adds electrical effort to the manual effort when the brakes are being applied. Solenoid 38 is described and claimed in my co-pending application, Serial No. 295,580 and the manner in which solenoid 38 and pedal 31 combine in an electric brake is disclosed in another co-pending application, Serial No. 295,578.

The ignition switch 25 is novel herein in that it has an "on", an "off" and a "coast" position instead of only an "off" and "on" position as is customary. An insulation handle 39 has metal members 40 and 41 imbedded therein. In the "coast" position, metal member 40 electrically connects terminals 42, 43, and 44, while in the "on" position metal member 41 joins terminals 45 and 46.

Fig. 3 shows diagrammatically how the several hereinbefore described elements of my braking system are connected, and a consideration of this diagram in connection with the following description will make the operation of the system clear.

The driver may at all times operate his brakes mechanically even if battery 47 fails, but with battery 47 in good condition and connected as shown he may have the magnetic assistance of solenoid 38 whenever he depresses pedal 31 and closes pedal switch 33.

Both mechanical and electrical braking means operate independently of the position of the ignition switch whether it shows "on", "off" or "coast". When the ignition switch is in the "on" position, the normal operation of the brakes, both electrical and mechanical, does not disturb the ignition or the carburetor, and the throttle 26 may be used as in ordinary practice. But when the ignition switch is thrown to the "coast" position, pressure on pedal tread 32 sufficient to close switch 33, operates the solenoid 38 to assist the brakes, operates the carburetor solenoid 22 to provide free passage of air to the intake manifold thus drawing no fuel, and cuts off the ignition by short circuiting the terminals of the primary coil 48. This short circuiting is brought about as follows: The primary coil 48 of the ignition embodies a relatively large resistance. When the ignition switch 39 is placed at "coast" position a certain amount of current passes through coil 38 to one terminal of pedal switch 33 and thence on to the terminal 42, from which the bridge plate 40 permits its passage through the coil 48. At the same time the current passes through coil 22 and thence to terminal 44 of the ignition assembly switch, from which it is carried to terminal 43 by switch plate 39 and thence through coil 48. The resistance in the coil 48 is such that insufficient current to operate the solenoid 38 or solenoid core 23 is available under this condition. However, when the pedal switch 33 is depressed another circuit is completed through these coils 38 and 22 to the ground connected to the pedal switch. It is the bringing in of this secondary ground connection associated with the pedal switch which permits the current to pass through a conductor including much less resistance than that offered by the ignition coil 48 which operates to short circuit the said ignition coil and render the ignition for the motor inoperative. A resistance 49 is in series with coil 48 in the "on" circuit to balance the resistance of solenoids 38 and 22 in the "coast" circuit, and while with the ignition switch 25 in the "coast" position current passes through coils 38 and 22 prior to the closing of switch 33 this current is limited to the small amount which coil 48 will pass and does not operate these solenoids. The solenoids are operable only by the closing of switch 33.

To operate the system in descending a long incline the driver merely permits his clutch to remain in engagement and puts the ignition switch to "coast". Now as long as he does not need to apply the brake pedal the engine continues at normal operation under its own power and he may even accelerate the engine if required. But from the instant he depresses the brake pedal until it is again released the ignition and fuel are off and the engine has free intake of cooling air.

If it is found that on parts of the incline the driven engine and the brakes together momentarily produce too much retardation the pedal 31 may be temporarily released. During such time as the pedal is released the ignition and carburetor operate in an entirely normal manner.

At the end of the incline the ignition switch is returned to the "on" position. When in this position the operation of the brakes does not remove the means to propel the engine.

From the foregoing description it is apparent that by means of my braking system, a driver in coasting may relieve the friction elements of his braking system by using the resistance of the driven engine, without the danger of muffler explosions and without wasting ignition current or fuel, and at the same time keep his engine cooler than he may with the ordinary braking system.

While the principles of my improvements are embodied in the system hereinbefore shown and described, many variations in structure and arrangement are considered permissible within the spirit of the invention. With a view of embracing such permissible variations,

I claim:

1. A motor vehicle having, in combination, electrically operated brake apparatus, a power plant having fuel admission apparatus and fuel ignition apparatus, electrically operated control mechanism to render the fuel admission apparatus ineffective, an electric circuit including said brake apparatus, ignition apparatus and said control mechanism, a switch in said circuit having one position at which the brake apparatus may be operated without affecting the ignition apparatus or said control mechanism and having a second position at which operation of the brake apparatus automatically cuts out the ignition apparatus and operates the control mechanism to render the fuel admission apparatus ineffective.

2. A motor vehicle having, in combination, electrically operable brake mechanism, fuel control mechanism, ignition mechanism, said three mechanisms included in a circuit controlled by a switch having one position at which all three mechanisms are out of the circuit, a second position at which the ignition mechanism and the brake mechanism are effective and a third position at which operation of the brake mechanism automatically cuts out the ignition mechanism and renders the fuel control mechanism ineffective.

3. A motor vehicle having, in combination, brakes, a brake pedal, electromagnetic means to assist said pedal, a carburetor, electromagnetic means to render said carburetor ineffective, ignition mechanism, an ignition switch operable to several positions, a second switch operable by effort applied to the pedal, and connections between said switches said electromagnetic means and said ignition mechanism whereby operation of the pedal switch at one position of the ignition switch applies the brakes only and at a second position of the ignition switch applies the brakes and at the same time cuts off the ignition and renders the carburetor ineffective.

4. A motor vehicle having, in combination, brakes, mechanical means to apply the brakes, electrical means to apply the brakes, a carburetor, electrical means to render the carburetor ineffective, ignition mechanism including an ignition coil, a circuit including both of said electrical means and the said ignition mechanism, an ignition switch in said circuit operable to a plurality of positions, a second switch in said circuit controlling the electrical means that operates the brakes, and connections in said circuit between said switches and both said electrical means and said ignition mechanism whereby operation of said second switch at one position of the ignition switch applies the brakes without affecting the ignition mechanism or the carburetor and at a second position of the ignition switch applies the brakes and at the same time short circuits the ignition coil cutting off the ignition apparatus and operating one of said electrical means rendering the carburetor ineffective.

5. A motor vehicle having, in combination, brakes, an internal combustion engine provided with fuel feed mechanism and a controlled air intake, electric power means coupled with said brakes and the air intake control, an electric circuit including said power means and a switch having one position at which the power means is effective to assist in applying the brakes and operable to render the fuel feed mechanism ineffective and to open the air intake and having a second position at which the power means is effective to assist in applying the brakes only.

6. A motor vehicle having, in combination, brakes, an internal combustion engine provided with fuel feed mechanism and a controlled air intake, electric power means coupled with said brakes and the air intake control, an electric circuit including said power means and a switch having one position at which the power means is effective to assist in applying the brakes and operable to open the air intake automatically upon application of the brakes and a second position at which the power means is effective to assist in applying the brakes only.

7. A motor vehicle having, in combination, brakes, an internal combustion engine provided with fuel feed mechanism, a controlled air intake and ignition mechanism, an electric circuit including power means coupled with said brakes and the air intake control and a switch having an "on" position at which the ignition mechanism is effective and the power means is effective to assist in applying the brakes only, an "off" position at which the ignition mechanism is ineffective and the power means is effective to assist in applying the brakes only, and a "coast" position at which the ignition mechanism is effective and the power means is effective to assist in applyng the brakes and effective to render the fuel feed mechanism inoperative and to automatically open the controlled air intake.

8. A motor vehicle having, in combination, brakes, an internal combustion engine provided with ignition mechanism and a controlled air intake to admit air into the engine, power means operable to assist in applying the brakes and operable to open said controlled air intake, an electric circuit including said power means and including a switch having one position at which the ignition mechanism is effective and the power means may be rendered effective to assist in applying the brakes but is ineffective to open said controlled air intake, and a second position at which the ignition mechanism is ineffective and the power means may be rendered effective to assist in applying the brakes but is ineffective to open said controlled air intake, and a third position at which the ignition mechanism is effective and the power means may be rendered effective to assist in applying the brakes and to open said controlled air intake.

9. A motor vehicle having, in combination, brakes, an internal combustion engine provided with ignition mechanism and a controlled air intake to admit air into the engine, power means operable to assist in applying the brakes and operable to open said controlled air intake, an electric circuit including said power means and including a switch having one position at which the ignition mechanism is effective and the power means may be rendered effective to assist in applying the brakes but is ineffective to open said controlled air intake, and a second position at which the ignition mechanism is ineffective and the power means may be rendered effective to assist in applying the brakes but is ineffective to open said controlled air intake, and a third position at which the ignition mechanism is effective and the power means may be rendered effective to assist in applying the brakes and to open said controlled air intake, a brake pedal connected with the brakes to mechanically apply the brakes and having a switch arranged in said circuit and operable to render the power means effective to apply the brakes in any one of said three positions of the first switch and operable to render the power means effective to open said controlled air intake only in the third position of the first switch.

10. A motor vehicle having, in combination, brakes, a brake pedal, electromagnetic means to assist said pedal, a carburetor, electromagnetic means to render said carburetor ineffective, an electric circuit including both magnetic means and having a switch carried by the pedal operable to close the circuit to energize both means to automatically render said carburetor effective and to assist the pedal in applying the brakes.

11. In combination with a motor vehicle including brakes and an ignition circuit, said ignition circuit including a plurality of circuits, means manually adjustable to close any one of said circuits, and means operable automatically upon application of said brakes when a particular one only of said circuits is closed for cutting out said ignition circuit.

12. In combination with a motor vehicle having brakes, brake applying means, two ignition circuits, manually adjustable means operable to close either of said circuits, and means associated with said brake applying means whereby the ignition is cut off automatically on application of the brakes when a particular one of said ignition circuits is closed.

In testimony whereof, I, VINCENT G. APPLE, sign this specification.

VINCENT G. APPLE.